(12) United States Patent
Chaapel

(10) Patent No.: US 10,876,519 B1
(45) Date of Patent: Dec. 29, 2020

(54) POWER GENERATING DEVICE

(71) Applicant: Thomas Chaapel, Calhoun, GA (US)

(72) Inventor: Thomas Chaapel, Calhoun, GA (US)

( * ) Notice: Subject to any disclaimer, the term of this patent is extended or adjusted under 35 U.S.C. 154(b) by 0 days.

(21) Appl. No.: 16/675,330

(22) Filed: Nov. 6, 2019

(51) Int. Cl.
*F03D 13/20* (2016.01)
*F03D 1/04* (2006.01)
*F03D 1/06* (2006.01)

(52) U.S. Cl.
CPC .............. *F03D 13/20* (2016.05); *F03D 1/04* (2013.01); *F03D 1/0633* (2013.01); *F05B 2240/131* (2013.01)

(58) Field of Classification Search
CPC ........... F03D 1/04; F03D 1/0633; F03D 13/20
USPC ...................................... 290/44, 55
See application file for complete search history.

(56) References Cited

U.S. PATENT DOCUMENTS

| | | | | |
|---|---|---|---|---|
| 1,112,203 A | * | 9/1914 | Fandrey | F03D 9/35 415/4.4 |
| 3,936,652 A | * | 2/1976 | Levine | F03D 9/00 290/2 |
| 4,016,725 A | * | 4/1977 | Fiss | F28C 1/00 60/690 |
| 4,031,173 A | * | 6/1977 | Rogers | F03D 13/20 261/24 |
| 4,036,916 A | * | 7/1977 | Agsten | F03D 9/25 261/109 |
| 4,070,131 A | | 1/1978 | Yen | |
| 4,236,866 A | * | 12/1980 | Zapata Martinez | F03D 9/28 415/4.4 |
| 4,421,452 A | * | 12/1983 | Rougemont | F03D 1/04 415/4.2 |
| 4,433,544 A | * | 2/1984 | Wells | F03D 9/007 60/641.12 |
| 4,452,046 A | * | 6/1984 | Valentin | F03D 9/39 60/641.11 |
| 4,452,562 A | * | 6/1984 | Hsu | F03D 1/04 415/208.1 |
| 4,499,034 A | * | 2/1985 | McAllister, Jr. | F28B 1/06 261/109 |
| 4,508,973 A | * | 4/1985 | Payne | F03D 1/04 290/55 |
| 4,781,523 A | | 11/1988 | Aylor | |
| 4,935,639 A | * | 6/1990 | Yeh | F03D 1/04 290/55 |
| 5,284,628 A | * | 2/1994 | Prueitt | B01D 47/06 261/116 |
| 5,300,817 A | * | 4/1994 | Baird | F03G 6/045 290/55 |

(Continued)

*Primary Examiner* — Pedro J Cuevas

(57) ABSTRACT

A power generating device for generating an electrical current from an updraft in a tower includes a tower, a rotor assembly, and a set of generators. The tower is hyperboloid type so that the tower is configured to generate a pressure differential between a base and a top of the tower. A set of openings that is positioned in the tower proximate to the base is configured to allow passage of air from the base through the top. The rotor assembly is coupled to and positioned in the tower so that a set of blades of the rotor assembly is configured to be rotated due to the air passing through the tower. Each generator is operationally coupled to a drive shaft of the rotor assembly so that the set of generators is configured to convert kinetic energy of the air to an electrical current as the drive shaft is rotated.

6 Claims, 3 Drawing Sheets

(56) References Cited

U.S. PATENT DOCUMENTS

| | | | | |
|---|---|---|---|---|
| 5,395,598 A * | 3/1995 | Prueitt | B01D 47/06 | 261/116 |
| 5,477,684 A * | 12/1995 | Prueitt | B01D 47/06 | 261/116 |
| 5,483,798 A * | 1/1996 | Prueitt | B01D 47/06 | 60/641.2 |
| 5,982,046 A * | 11/1999 | Minh | F03D 1/04 | 290/55 |
| 6,510,687 B1 * | 1/2003 | Zaslavsky | F03D 1/00 | 52/245 |
| 6,532,740 B1 * | 3/2003 | Sullivan | F03G 6/064 | 60/641.11 |
| 6,590,300 B1 * | 7/2003 | Preito Santiago | F03D 3/04 | 290/55 |
| 6,703,720 B1 * | 3/2004 | Ferraro | F03D 13/10 | 290/55 |
| 6,717,285 B2 * | 4/2004 | Ferraro | F03D 1/04 | 290/55 |
| 6,772,593 B2 * | 8/2004 | Dunn | F03G 6/045 | 60/641.11 |
| 6,943,461 B2 * | 9/2005 | Kaploun | H02K 7/183 | 290/43 |
| 6,981,839 B2 | 1/2006 | Fan | | |
| 7,154,190 B2 * | 12/2006 | Kaploun | H02K 7/183 | 290/43 |
| 7,205,678 B2 | 4/2007 | Casazza | | |
| 7,400,057 B2 * | 7/2008 | Sureshan | F03D 1/04 | 290/55 |
| 7,511,387 B2 * | 3/2009 | Fakhrai | F03D 1/04 | 290/54 |
| 7,777,363 B2 * | 8/2010 | Wang | F03D 80/30 | 290/55 |
| 7,821,151 B2 * | 10/2010 | Le | F03D 9/37 | 290/55 |
| 7,931,434 B2 * | 4/2011 | Raynal | F03G 7/04 | 415/2.1 |
| 7,946,802 B1 * | 5/2011 | Iskrenovic | F03D 13/20 | 415/4.2 |
| 7,956,487 B2 * | 6/2011 | Hovakimian | F03G 6/045 | 290/55 |
| 8,128,337 B2 * | 3/2012 | Pezaris | F03D 9/25 | 415/4.2 |
| 8,552,580 B2 * | 10/2013 | Tackett | F03D 7/042 | 290/55 |
| 8,836,158 B2 * | 9/2014 | Cho | F03D 15/00 | 290/55 |
| 8,875,509 B2 * | 11/2014 | Glezer | F03G 6/04 | 60/641.11 |
| 8,905,706 B2 | 12/2014 | Bills | | |
| 9,062,896 B2 * | 6/2015 | Nix | F24S 60/00 | |
| 9,670,899 B2 * | 6/2017 | Steinlechner | F03D 1/065 | |
| 9,861,540 B2 * | 1/2018 | Hays | A61G 5/045 | |
| 9,863,313 B2 * | 1/2018 | Glezer | F03D 9/25 | |
| 9,997,978 B2 * | 6/2018 | Hovakimian | F03D 9/00 | |
| 10,492,964 B2 * | 12/2019 | Hays | B60K 7/0007 | |
| 10,648,458 B2 * | 5/2020 | Nix | F03G 6/04 | |
| 10,730,586 B2 * | 8/2020 | Hays | B60B 19/00 | |
| 2002/0162329 A1 * | 11/2002 | Dunn | F03D 9/007 | 60/641.8 |
| 2010/0109337 A1 * | 5/2010 | Wang | F03D 80/30 | 290/55 |
| 2013/0277971 A1 * | 10/2013 | Cho | F03D 15/10 | 290/55 |
| 2016/0025067 A1 * | 1/2016 | Pristash | F03D 3/0427 | 290/55 |
| 2020/0263668 A1 * | 8/2020 | Baun | F03D 1/02 | |

\* cited by examiner

POWER GENERATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to power generating devices and more particularly pertains to a new power generating device for generating an electrical current from an updraft in a tower.

(2) Description of Related Art Including Information Disclosed Under 37 CFR 1.97 and 1.98

The prior art relates to power generating devices. Prior art power generating devices may comprise a turbine, which may be utilized in combination with a tower to direct an updraft to the turbine, or which may be turned by wind.

BRIEF SUMMARY OF THE INVENTION

An embodiment of the disclosure meets the needs presented above by generally comprising a tower, a rotor assembly, and a set of generators. The tower is hyperboloid type so that the tower is configured to generate a pressure differential between a base and a top of the tower. A set of openings that is positioned in the tower proximate to the base is configured to allow passage of air from the base through the top of the tower. The rotor assembly is coupled to and positioned in the tower so that a set of blades of the rotor assembly is configured to be rotated due to the air passing through the tower. Each generator is operationally coupled to a drive shaft of the rotor assembly so that the set of generators is configured to convert kinetic energy of the air passing through the tower to an electrical current as the drive shaft is rotated by the set of blades.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
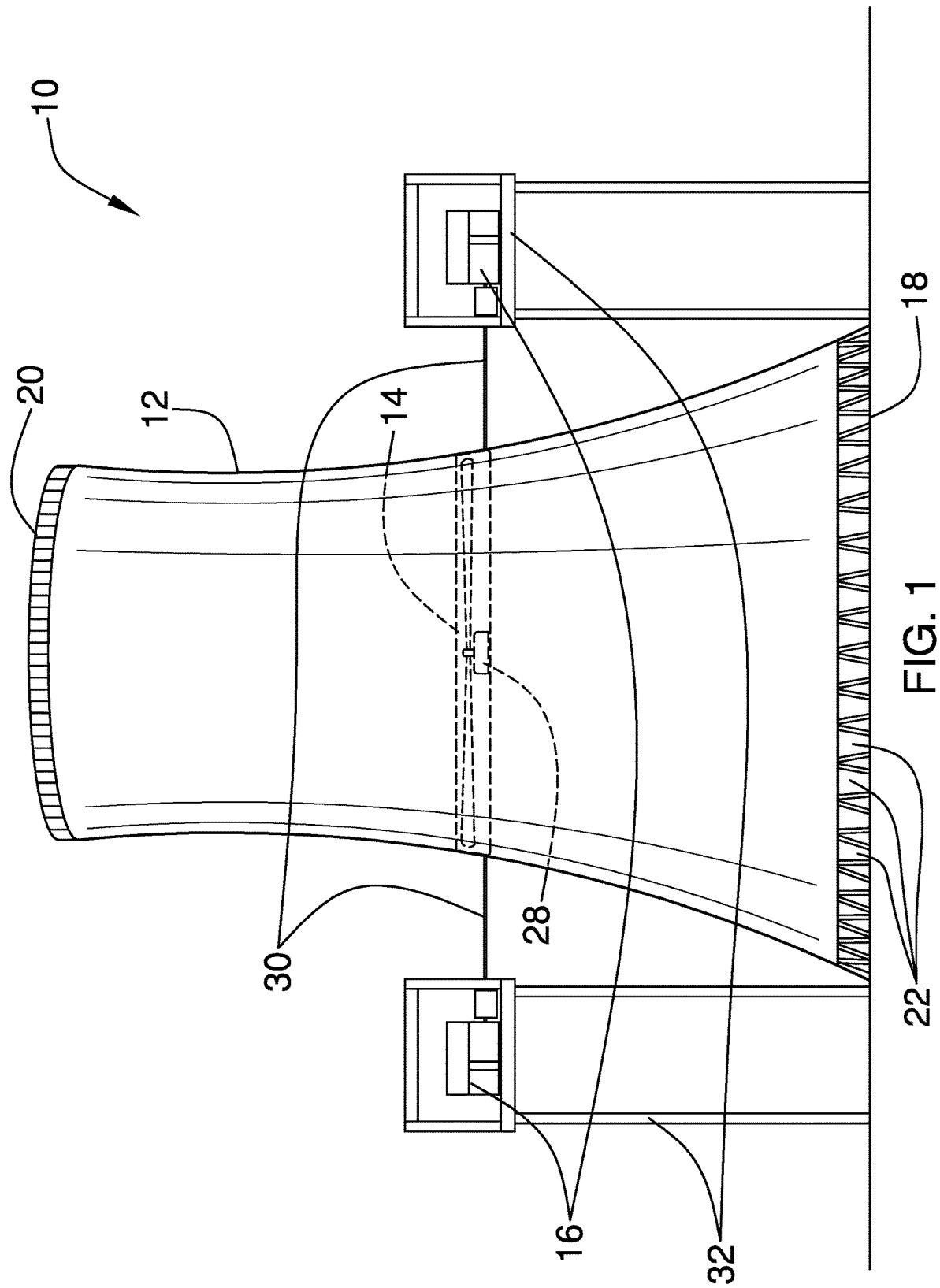
FIG. 1 is a front view of a power generating device according to an embodiment of the disclosure.
Figure 2:
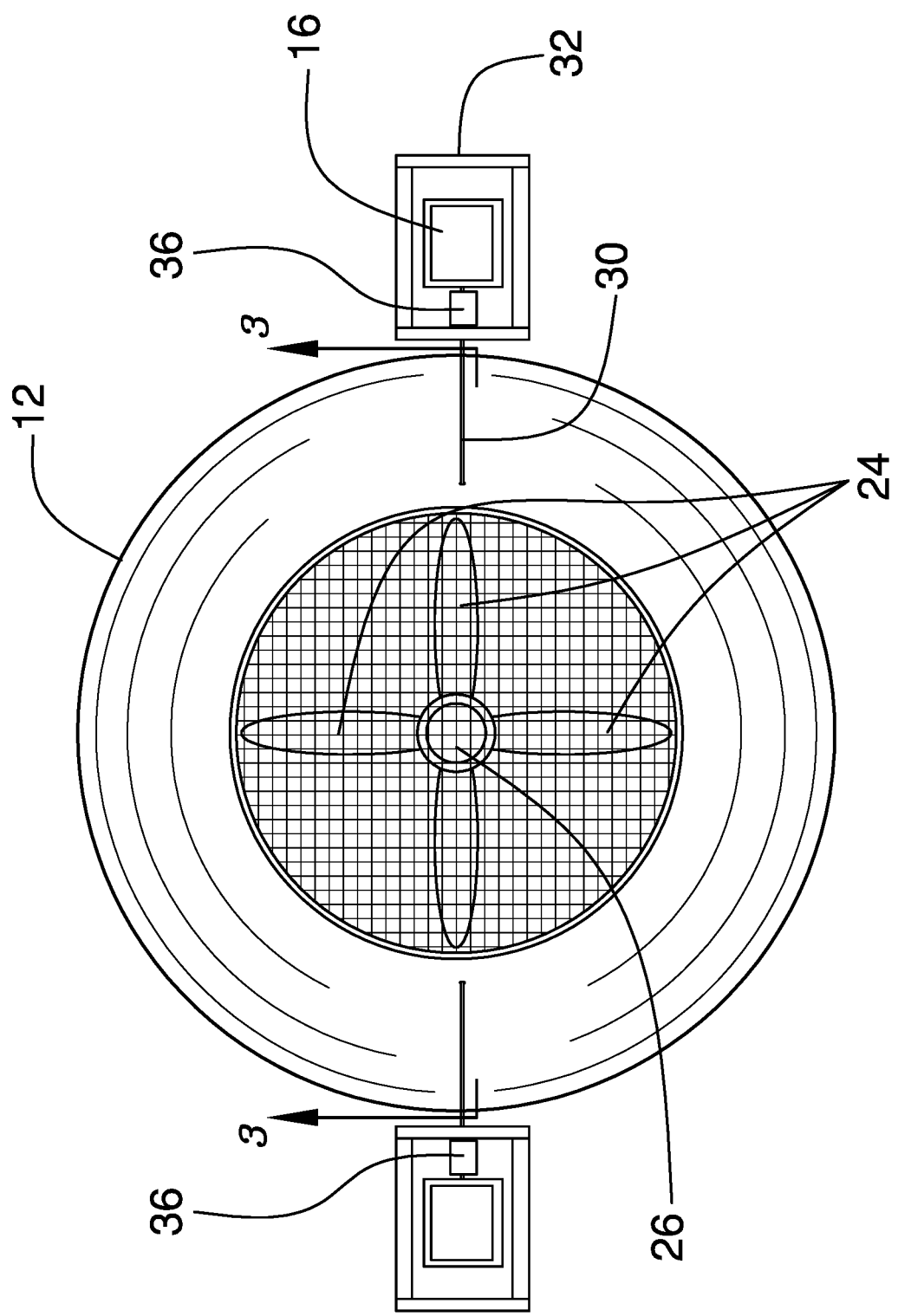
FIG. 2 is a top view of an embodiment of the disclosure.
Figure 3:
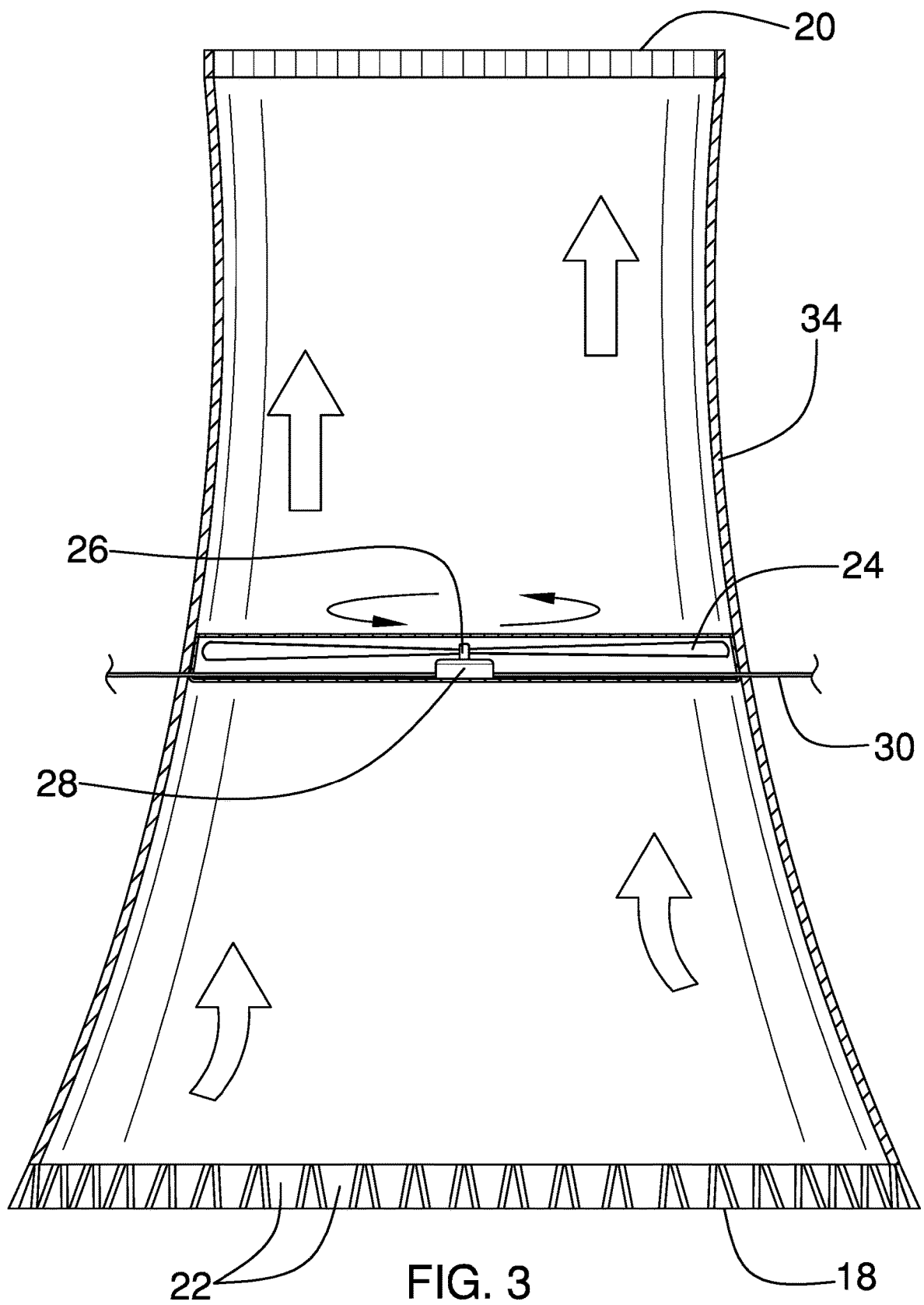
FIG. 3 is a cross-sectional view of an embodiment of the disclosure.

With reference now to the drawings, and in particular to FIGS. 1 through 3 thereof, a new power generating device embodying the principles and concepts of an embodiment of the disclosure and generally designated by the reference numeral 10 will be described.

As best illustrated in FIGS. 1 through 3, the power generating device 10 generally comprises a tower 12, a rotor assembly 14, and a set of generators 16. The tower 12 is hyperboloid type so that the tower 12 is configured to generate a pressure differential between a base 18 and a top 20 of the tower 12. A set of openings 22 that is positioned in the tower 12 proximate to the base 18 is configured to allow passage of air from the base 18 through the top 20 of the tower 12. The tower 12 is anticipated to comprise either a cooling tower from a decommissioned power plant or a purpose-built tower.

The rotor assembly 14 is coupled to and positioned in the tower 12 so that a set of blades 24 of the rotor assembly 14 is configured to be rotated due to the air passing through the tower 12. The rotor assembly 14 may be positioned substantially equally distant from the base 18 and the top 20 of the tower 12, as shown in FIG. 3. The present invention also anticipates the rotor assembly 14 being positioned closer to the top 20 of the tower 12. In either case, the set of blades 24 is anticipated to be substantially circumferentially equivalent to the tower 12.

Each generator 16 is operationally coupled to a drive shaft 26 of the rotor assembly 14 so that the set of generators 16 is configured to convert kinetic energy of the air passing through the tower 12 to an electrical current as the drive shaft 26 is rotated by the set of blades 24. The set of generators 16 may be positioned externally to the tower 12, as shown in FIG. 1. The set of generators 16 may comprise two generators 16. The present invention also anticipates other numbers of generators 16, such as, but not limited to, a single generator 16 coupled to the rotor assembly 14 and positioned within the tower 12.

A bevel gear assembly 28 that is operationally coupled to the drive shaft 26 is positioned to translate rotation of the drive shaft 26 to a set of transfer shafts 30. Each transfer shaft 30 is operationally coupled to a respective generator 16.

Each of a set of platforms 32 is positioned proximate to the tower 12 so that the platform 32 is positioned to support a respective generator 16 with the generator 16 aligned to an associated transfer shaft 30 that extends horizontally from the bevel gear assembly 28 through a wall 34 of the tower 12.

Each of a set of gear boxes 36 is operationally coupled to and positioned between a respective generator 16 and the drive shaft 26 so that the gear box 36 is positioned to regulate torque that is transferred from the drive shaft 26 to the respective generator 16. The present invention anticipates the rotational speed of the set of blades 24 being regulated by dampeners positioned in the set of openings 22 of the tower 12. Additionally, the present invention anticipates use of Load Commutated Inverter technology (not shown) to motorize operation of the generator.

In use, an updraft of air that is generated by the tower 12 rotates the set of blades 24 and the drive shaft 26. The set of generators 16 converts the rotation of the drive shaft 26 to an electrical current without use of fossil fuel.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A power generating device comprising:
   a tower, the tower being hyperboloid type wherein the tower is configured for generating a pressure differential between a base and a top of the tower;
   a set of openings positioned in the tower proximate to the base wherein the set of openings is configured for passing of air from the base through the top of the tower;
   a rotor assembly coupled to and positioned in the tower wherein a set of blades of the rotor assembly is configured for rotating due to the air passing through the tower;
   a set of generators, each generator being operationally coupled to a drive shaft of the rotor assembly wherein the set of generators is configured for converting kinetic energy of the air passing through the tower to an electrical current as the drive shaft is rotated by the set of blades, the set of generators being external to the tower;
   a bevel gear assembly operationally coupled to the drive shaft such that the bevel gear assembly is positioned for translating rotation of the drive shaft to a set of transfer shafts, each transfer shaft being operationally coupled to a respective generator; and
   a set of platforms, each platform being positioned proximate to the tower such that the platform is positioned for supporting a respective generator such that the generator is aligned with an associated transfer shaft extending horizontally from the bevel gear assembly through a wall of the tower.

2. The device of claim 1, further including the rotor assembly being positioned substantially equally distant from the base and the top of the tower.

3. The device of claim 1, further including the set of generators comprising two generators.

4. The device of claim 1, further including a bevel gear assembly operationally coupled to the drive shaft such that the bevel gear assembly is positioned for translating rotation of the drive shaft to a set of transfer shafts, each transfer shaft being operationally coupled to a respective generator.

5. The device of claim 1, further including a set of gear boxes, each gear box being operationally coupled to and positioned between a respective generator and the drive shaft such that the gear box is positioned for regulating torque transferred from the drive shaft to the respective generator.

6. A power generating device comprising:
   a tower, the tower being hyperboloid type wherein the tower is configured for generating a pressure differential between a base and a top of the tower;
   a set of openings positioned in the tower proximate to the base wherein the set of openings is configured for passing of air from the base through the top of the tower;
   a rotor assembly coupled to and positioned in the tower wherein a set of blades of the rotor assembly is configured for rotating due to the air passing through the tower, the rotor assembly being positioned substantially equally distant from the base and the top of the tower;
   a set of generators, each generator being operationally coupled to a drive shaft of the rotor assembly wherein the set of generators is configured for converting kinetic energy of the air passing through the tower to an electrical current as the drive shaft is rotated by the set of blades, the set of generators being external to the tower, the set of generators comprising two generators;
   a bevel gear assembly operationally coupled to the drive shaft such that the bevel gear assembly is positioned for translating rotation of the drive shaft to a set of transfer shafts, each transfer shaft being operationally coupled to a respective generator;
   a set of platforms, each platform being positioned proximate to the tower such that the platform is positioned for supporting a respective generator such that the generator is aligned with an associated transfer shaft extending horizontally from the bevel gear assembly through a wall of the tower; and
   a set of gear boxes, each gear box being operationally coupled to and positioned between a respective generator and the drive shaft such that the gear box is positioned for regulating torque transferred from the drive shaft to the respective generator.

* * * * *